United States Patent [19]
Kocab et al.

[11] Patent Number: 5,577,565
[45] Date of Patent: Nov. 26, 1996

[54] COMPACT ROLLER CUTTER

[75] Inventors: John P. Kocab, Cleveland Heights; Dennis M. Ofiara, Macedonia, both of Ohio

[73] Assignee: Boretec, Inc., Solon, Ohio

[21] Appl. No.: 496,391

[22] Filed: Jun. 29, 1995

[51] Int. Cl.$^6$ .......................... E21B 10/20; E21B 10/22
[52] U.S. Cl. .................. 175/228; 175/363; 175/364; 175/372
[58] Field of Search ..................... 175/228, 363, 175/364, 371, 372, 373

[56] References Cited

U.S. PATENT DOCUMENTS

| | | | |
|---|---|---|---|
| 3,216,513 | 11/1965 | Robbins et al. | 175/364 X |
| 3,612,196 | 10/1972 | Dixon | 175/364 |
| 3,787,101 | 1/1974 | Sugden | 175/364 X |
| 3,791,705 | 2/1974 | Schimel | 175/363 X |
| 4,202,418 | 5/1980 | Waddell | 175/363 X |
| 5,507,355 | 4/1996 | Mattsson | 175/371 |

FOREIGN PATENT DOCUMENTS

| | | | |
|---|---|---|---|
| 2228727 | 1/1974 | Germany | 175/372 |
| 4-93487 | 3/1992 | Japan | 175/372 |
| 252970 | 7/1970 | Russian Federation | 175/228 |

*Primary Examiner*—Hoang C. Dang
*Attorney, Agent, or Firm*—Pearne, Gordon, McCoy & Granger

[57] ABSTRACT

A roller cutter assembly for use in hard rock tunneling machines comprises a rectangular saddle having a rectangular recess with V-shaped mounting surfaces. Support plates are secured against these mounting surfaces, and the support plates have a shaft extending between them with a non-rotatable head in one plate, and the circular nut in the other plate. The shaft mounts a pair of inner races for tapered roller bearings which run directly on the roller cutter inner surface which forms the outer race for the bearing assembly. Rotation of the circular nut in the recess and on the shaft sets the preload for these bearings. Between the nut and its recess on the adjacent support plate is an annular groove formed in both the support plate and the nut, and an elastomeric diaphragm fits across this groove. The inner side communicates with the oil-filled chamber around the bearings, while the outer side has passages through the nut to the exterior so that ambient pressure is transmitted to the diaphragm, and hence, to the lubricating oil, to provide pressure compensation.

9 Claims, 2 Drawing Sheets

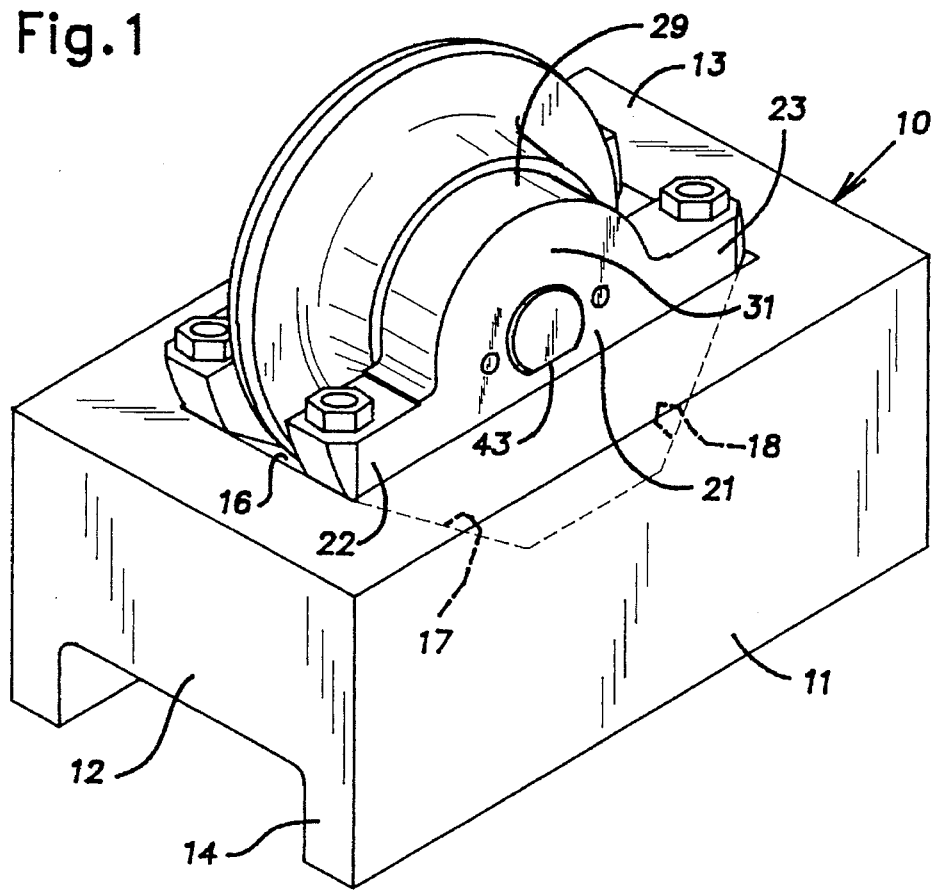
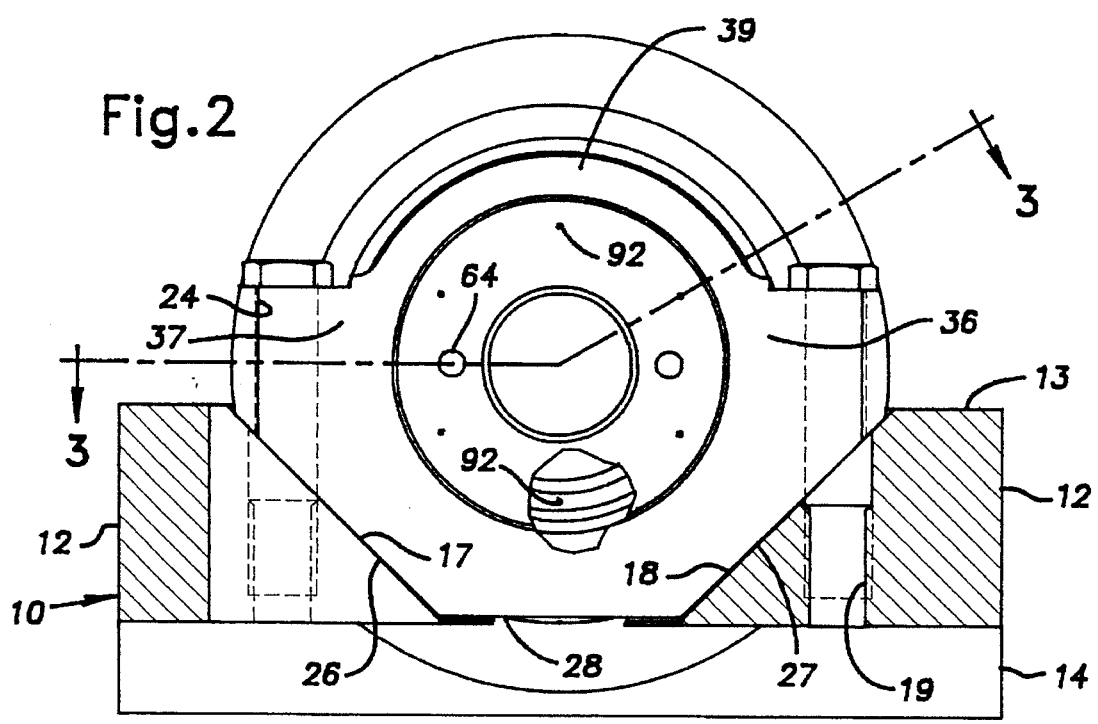

COMPACT ROLLER CUTTER

BACKGROUND OF THE INVENTION

This invention relates generally to disc-type roller cutters used for cutting hard rock, and more particularly, to disc-type cutters of the single disc type of small or compact size which are adapted for use on small diameter hard rock tunnelling machines, such as those used for tunnels having a diameter in the range of 0.5 to 2 meters.

Tunnel boring machines, particularly for those used in hard rock formations, bore a cylindrical tunnel using a single cutter head which rotates about the axis of the tunnel and is pushed forward against the rock face by suitable hydraulic thrust cylinders which react against a frame that grips the side walls of the tunnel already cut, or, in the case of small diameter machines, react against the installed tunnel lining.

The cutter head is provided with a number of cutters on its face, the number of which generally depends upon the diameter of the tunnel being cut, and these cutters are generally positioned at various places around the face of the cutter head in a pattern which provides balance loading around the axis for uniform thrust purposes and proper spacing to provide the desired uniform cutting over the working face of the tunnel. While stationary pick-type cutters may be used in soft ground, it has been found that in cutting rock, a disc-type cutter which rolls about an axis parallel to the tunnel face is far more efficient and has far longer life. If the rock is not too hard, a cutter may have a number of circular edges projecting from a single member which rotates about a shaft whose ends are mounted on a suitable saddle attached to the cutter head. However, when harder rock is encountered, each cutter generally has a single edge mounted on a short shaft which allows greater thrust forces per cutting edge to be used for the cutter head.

Heretofore, the trend has been to use larger and larger diameter cutters because these allow greater thrust forces and because the larger sized cutters can employ higher capacity bearings while providing adequate bearing life in use. However, past cutter design has required cutters of such a size that they can generally only be used on tunnels that are two meters in diameter or larger, since proper cutting action requires such a multiplicity of cutters that there is not adequate space for larger cutters on a smaller sized cutter head.

For this reason, smaller diameter cutter heads, generally those of less than two meters in diameter, have used cutters which are mounted on a cantilever shaft extending from a pedestal-type mount. These cutters were often of the multi-row-type having a plurality of cutter rings formed on a single member, or with a large number of hard carbide buttons in the place of the annular rings. With such cutters, the cantilever construction results in limitations on the total thrust force of the cutter head against the rock. Thus, to provide improved cutting action, greater numbers of cutters are required, with the force of each cutting edge against the rock being much lower than desired. The result is a slower cutting action with increased energy requirements because the rock tends to be broken into smaller and smaller pieces.

SUMMARY OF THE INVENTION

The preferred embodiment of the present invention provides an improved single disc roller cutter of smaller or compact size that is particularly adapted for use on smaller diameter hard rock tunneling machines.

According to the present invention, a single disc is rotatably journalled on high capacity bearings, such as tapered roller bearings, on a fixed shaft which is supported at each end within a pair of support plates having a relatively short spacing between the outer surfaces. The support plates have V-shaped surfaces on their lower sides and fit within a rectangular saddle having closely spaced parallel sides and tapered surfaces to receive the support plates which are bolted directly to the saddle. The resulting assembly allows high thrust loads to be applied through the single disc cutter against the rock face. Because of the compact bearing and support arrangement, multiple cutters can be stacked in a line very closely together since the overall width of the saddle along the axis of rotation of the cutter can be less than the diameter of the cutter itself.

According to the present invention, the shaft has an enlarged head with a flat portion which fits within the similar shaped recess on one side plate to be flush with the outer surface, while the flat portion prevents rotation of the head and shaft with respect to the side plate. The shaft supports a pair of opposed cones which serve as the inner races for a pair of tapered roller bearings, and the shaft has a threaded end which extends through the other support plate where it receives a nut which is, preferably, circular in shape, to fit within the like recess on the other side plate so that nothing projects laterally beyond either of the side plate outer surfaces. By tightening the nut, the spacing of the cones can be regulated to provide the desired preload on the tapered roller bearings, and this is held by staking the nut in place to the shaft after the desired preload has been accomplished.

According to another feature of the present invention, the tapered roller bearings do not require a separate outer race member, but rather, roll directly on surfaces formed on the cutting disc itself, which may be made of a suitable steel and heat treated to provide a surface essentially the same as a normal outer race with the desired hardness and toughness for the cutting edge itself around the outer periphery of the cutter disc.

According to another feature of the present invention, a pressure compensation is provided for the lubricant carried within the cutter around the bearings which are provided with suitable seals running directly between the side plates and the cutter disc. The nut is provided with an annular channel on its inner surface which mates with a similar channel on the adjacent side plate to provide an annular chamber across which a flexible elastomeric diaphragm is placed and which is normally formed to extend in contact with the annular surface on the nut. The nut is provided with a number of small passages which allow any ambient pressure to be exerted against the outer surface of the annular diaphragm to maintain a pressure on the lubricating oil nearly as great as any external pressure to which the seals are exposed. This will prevent the possibility of any negative pressure allowing external fluids and contaminants to enter the bearing chamber. If any lubricant is lost past the seal, the annular diaphragm can move inward to force lubricating oil in the annular chamber into the bearing chamber to make up for the leakage.

Further objects and advantages of the invention will readily become apparent upon a more complete understanding of the features and advantages of the invention as described in the detailed description and shown on the accompanying drawings.

BRIEF DESCRIPTION OF THE DRAWINGS

FIG. 1 is a perspective view of the cutter assembly and support saddle according to the preferred embodiment of the invention;

FIG. 2 is a longitudinal section through the saddle showing the cutter assembly in elevation.

DETAILED DESCRIPTION OF THE PREFERRED EMBODIMENT

Figure 3:
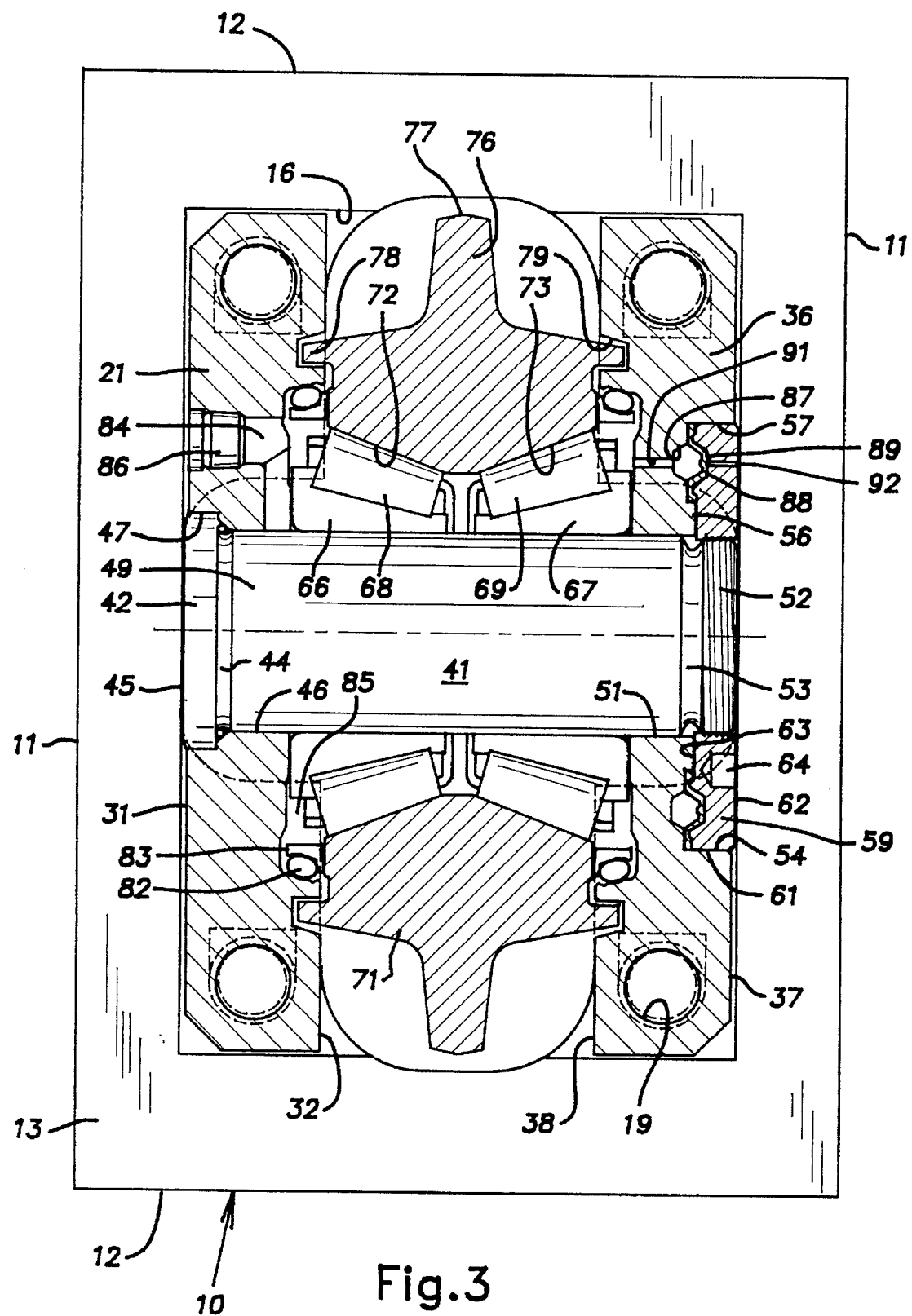
FIG. 3 is a cross-sectional view of the cutter assembly taken on line 3—3 of FIG. 2.

Referring now to the drawings in greater detail, FIG. 1 shows the roller cutter assembly mounted in a saddle 10 which is generally rectangular in form to have a pair of parallel side faces 11, end faces 12, and a top face 13 where the cutter is mounted. The sides 11 extend downward over support legs 14 which serve to space the cutter assembly away from any support structure and allow mounting of the saddle to that support structure, usually by welding.

The top face 13 has an opening 16 generally rectangular in shape, with a pair of sloping mounting surfaces 17 and 18 which converge toward the bottom to provide a pair of V-shaped surfaces, and near the upper ends of each of these surfaces is a tapped hole or bore 19 for receiving a bolt to hold the cutter assembly in the saddle 10, as described in greater detail hereinafter.

The cutter assembly includes a pair of support plates which are basically similar to each other except for details regarding the mounting of the support plate and the provision for pressure compensation. The mounting of these support plates is identical so that the assembly can be turned 180°, as the direction of rotation of the cutter disk is not important. The first support plate 21 thus includes a pair of ears 22 and 23 projecting laterally and being provided with bolt holes 24 which align with the tapped holes 19 when the assembly is mounted on the saddle. The support plate 21 has a pair of V-shaped surfaces 26 and 27 connected at the bottom by an end face 28 that are designed to engage the mating surfaces 17 and 18 on the saddle in full abutting contact. The support plate 21 also includes a center portion 29 and has outer and inner faces 31 and 32 extending parallel to each other, with the outer face 31 being the one adjacent the surface of the saddle 10.

The second support plate 36 also has outer and inner faces 37 and 38 together with a center portion 39. This second support plate has ears and V-shaped surfaces identical with those of the first support plate 21 and differs only in the construction of the center portion 39. A shaft 41 extends between the two support plates 21 and 36, and the one end of the shaft 41 has an enlarged head 42 which has a flat 43 on one side (see FIG. 1). An O-ring groove 44 is formed on the shaft adjacent the head 42 which has a flat outer surface 45 extending perpendicular to the axis of the shaft, and the head 42 has a smooth cylindrical outer surface at all portions, except at the flat 43. The shaft 41 extends through a bore 46 in the center portion 29, and the bore 46 has a counterbore 47 on its outer side shaped to receive the head 42 with the outer surface 45 substantially flush with the outer face 31. Counterbore 47 is shaped to engage the flat 43 to prevent rotation of shaft 41 with respect to support plate 21.

The shaft 41 has a smooth cylindrical center portion 49 which extends to the second support plate 36 and through a bore 51 in the center portion 39. The end of the shaft 41 has a threaded portion 52 spaced from the center portion 49 by a thread relief groove 53, and its threaded portion 52 projects into a recess 54 formed in the outer face 37 around the bore 51. The recess 54 includes a flat annular face 56 extending around the bore 51 and a cylindrical surface 57 extending from the face 56 to the outer face 37. Within this space is positioned a nut 59 which makes threaded engagement with the threaded portion 52. The nut 59 has a cylindrical outer surface 61 extending adjacent the cylindrical surface 57 with enough clearance to allow rotation of the nut with respect to the recess 54. The nut 59 also has an outer face 62 which is flat and extends perpendicular to the axis of the shaft 41 and parallel to and substantially flush with the outer face 37, and its outer face may be provided with spanner recesses 64 to receive a suitable spanner wrench for tightening or loosening the nut on the shaft. The nut 59 also has an inner face 63 extending adjacent the face 56, as will be described in greater detail hereinafter.

A pair of facing roller bearing cones 66 and 67 are mounted on the center portion 49 of the shaft 41 between the support plates and have caged tapered roller units 68 and 69 journalled thereon. The cutter disc 71 is mounted on the rollers 68 and 69 by means of inner conical surfaces 72 and 73 of the cutter which form the outer race of the bearing. The cutter disc 71 has a cutter ridge 76 extending around its periphery and extending above the support plates' center portions 29 and 39 and the saddle 10 to be able to engage the rock face of the tunnel. The surface 77 of the cutter ridge 76 may be of any type or width, depending upon the type of rock being cut, and is made of a suitable tool steel which has been hardened enough to also serve as the outer bearing race on the inner surface. The cutter ridge 76 may also be widened or narrowed, as desired, and may even be used as a mount for carbide buttons in the manner well-known in the art.

Radially inward from the cutter ridge 76, the roller cutter 71 has a pair of laterally-extending flanges 78 which are received within grooves 79 formed on the support plate inner faces to provide a rough labyrinth seal to protect the main seal that is radially inward. Thus, inward of the annular flange 78, the roller cutter has radially-extending sealing faces which engage an annular inner seal member 83 which is held in place against rotation by an O-ring 82 so that the inner seal member 83 remains non-rotary to avoid any wear or damage to the O-ring 82. It should be understood that this seal is conventional in roller cutters, and therefore, need not be described in any greater detail.

As shown in FIG. 3, the first support plate 21 has a filler passage 84 therein which leads into the chamber 85 within the space defined between the two support plates, the shaft, and the roller cutter. This chamber 85 is intended to be completely filled with a lubricating oil, and the passage can be closed off by a suitable threaded pipe plug 86. The second support plate 36 has an annular groove 87 formed within the face 56 a spaced distance outward from the bore 51, and that groove faces a similarly shaped annular groove 88 formed on the inner face 63 of the nut 59. A molded elastomeric flexible diaphragm 89 is positioned within these grooves and anchored at either side radially and normally tends to lie along the side of the groove 88. As shown, the grooves may define a shape having a hexagonal cross-section, but other shapes may be used to allow the diaphragm to flex between a normal position lying against the surface of the groove 88 to an inward position lying against the surface of the groove 87. A plurality of passages 91 extend through the second support plate 36 from the groove 87 into the chamber 85. Similarly, a plurality of passages 92 extend from the groove 88 to the outer face 62 of the nut 59 and are, therefore, exposed to ambient conditions. Thus, when the chamber 85 is completely filled with lubricating oil, there is no air space within the chamber 85, and the diaphragm 89 is in the position shown in FIG. 3 against the surface of the groove 88. If the cutter is exposed to conditions of higher external pressure, that pressure is communicated through the passages 92 to the diaphragm 89 which transmits the pressure to the oil within the chamber 85 through the passages 91. In the event there is any leakage past the O-ring seals 82 or at the sealing face 83, any external pressure will cause the diaphragm 89 to flex toward the groove 87 to force oil through the passages 91 into the chamber 85 to make up for any such leakage.

Assembly of the cutter wheel is easily accomplished by placing an O-ring in the groove 44 and inserting the shaft 41 through the bore 46 until the head 42 is firmly seated in the counterbore 47. After that is done, the cone 66 is pressed onto the shaft 41 until it abuts against the first support plate inner face 32, after which the adjacent roller assembly 68 is mounted in place together with the adjacent O-ring seal 82 and seal member 83. The cutter disc 71 can then be mounted on the rollers 68, followed by the other set of rollers 69, and the other cone 67. The other O-ring seal 82 and inner seal member 83 are then assembled in place and the second support plate placed over the end of the shaft 41. The nut 59 is then threaded in place with the diaphragm 89, and using the spanner recesses 64, the nut is rotated with respect to the shaft until the desired preload on the bearings is obtained. To lock the nut 59 in place, it is then staked to the outer plate in the conventional manner, and the chamber 85 can be filled with lubricating oil, after which the filler passage 84 is closed by the plug 86, and the assembly is complete. During this assembly and the final tightening of the nut 59, it is important that the two side plates be accurately aligned as far as the V-surfaces 26 and 27 are concerned, since they will be non-rotatable with respect to each other once the nut 59 is staked in place. After the assembly is completed, the cutter assembly can be mounted in the saddle 10 by simply placing it in position and placing bolts 34 through the bolt holes 24 and tightening them in place. This arrangement allows easy removal and replacement of the cutter assembly from the saddle 10, which is normally welded to the cutter head, by simply removing the four bolts 34 and removing the old cutter assembly. Preferably, the opening 16 is sized in width so that the support plates have a minimum clearance, and the sides of the opening 16 extend across both the shaft head 42 and the nut 59 so that in the event that the nut 59 should loosen on the shaft 41, only limited loosening of the nut is permitted by the saddle 10.

The above-described construction provides a very compact cutter arrangement to allow maximum density of spacing on the cutter head while retaining the largest possible diameter for the cutter ridge 76, which will necessarily wear to a smaller diameter after use. By running the roller bearings directly on the inner surfaces 72 and 73 of the roller cutter, it is possible to use the maximum diameter, and hence, highest load capacity of the bearings, for a given diameter of the cutter 71. This allows the use of a large enough diameter shaft 41 to prevent any flexing and breaking in use together with the short space in between the support plates 21 and 36.

Further features and advantages of the invention will occur to those skilled in the art and may be resorted to without departing from the scope of the invention as defined in the following claims.

What is claimed is:

1. A roller cutter assembly comprising a saddle defining a recess having mounting surfaces thereon, first and second support plates each having positioning faces engageable with said mounting surfaces to position said support plates on said saddle, each of said support plates having an inner and an outer side, a shaft having an enlarged head at one end and a threaded portion at the other end, each of said support plates defining a bore adapted to receive said shaft, said shaft extending between said support plates and positioning said support plates a predetermined spaced distance apart with said plate sides parallel, said first plate having a recess on its outer side around said bore to receive said enlarged shaft head, a nut adapted to engage the threaded portion of said shaft, said second plate having a recess on its outer side to receive said nut on said shaft, a pair of tapered roller bearings having cone members on said shaft with the cone surfaces facing each other, a set of tapered rollers on each of said cone members, and a unitary annular cutter wheel having an outer cutting edge and an inner race surface journalled directly on said tapered rollers.

2. A roller cutter assembly as set forth in claim 1, wherein said shaft head is non-rotatably received in said first plate recess and is substantially flush with the adjacent outer side of said plate.

3. A roller cutter assembly as set forth in claim 1, wherein said nut is substantially flush with the outer side of said second plate.

4. A roller cutter assembly as set forth in claim 1, wherein said saddle recess is rectangular in shape with parallel sides closely abutting the outer sides of said support plates.

5. A roller cutter assembly as set forth in claim 4, wherein said saddle mounting surfaces are V-shaped adjacent said saddle parallel sides and said support plate positioning faces are V-shaped to make abutting engagement With said mounting surfaces.

6. A roller cutter assembly as set forth in claim 5, wherein said support plates are secured to said saddle by fasteners extending through said mounting surfaces and said positioning faces.

7. A roller cutter assembly comprising a saddle defining a recess having mounting surfaces thereon, first and second support plates each having positioning faces engageable with said mounting surfaces to position said support plates on said saddle, each of said support plates having an inner and an outer side, a shaft having an enlarged head at one end and a threaded portion at the other end, each of said support plates defining a bore adapted to receive said shaft, said shaft extending between said support plates and positioning said support plates a predetermined spaced distance apart with said plate sides parallel, said first plate having a recess on its outer side around said bore to receive said enlarged shaft head, a nut adapted to engage the threaded portion of said shaft, said second plate having a recess on its outer side around its bore to receive said nut on said shaft, a pair of tapered roller bearings having cone members on said shaft with the cone surfaces facing each other, a set of tapered rollers on each of said cone members, a unitary annular cutter disc having an outer cutting edge and an inner race surface journalled directly on said tapered rollers, said second plate recess including an annular surface adjacent said nut, an annular groove in said annular surface, an annular flexible diaphragm extending over said groove, at least one passage extending from said annular groove through said support plate to the inner side, and at least one passage extending through said nut from said diaphragm to the exterior of the nut.

8. A roller cutter assembly as set forth in claim 7, wherein said nut has an annular groove facing said diaphragm and said diaphragm normally lies against the surface of said nut groove.

9. A roller cutter assembly as set forth in claim 8, wherein both grooves together form a hexagon shape in cross-section.

* * * * *